April 14, 1970 R. L. VESCO 3,506,030
SOLENOID OPERATED BALL VALVE
Filed Oct. 27, 1966 2 Sheets-Sheet 1
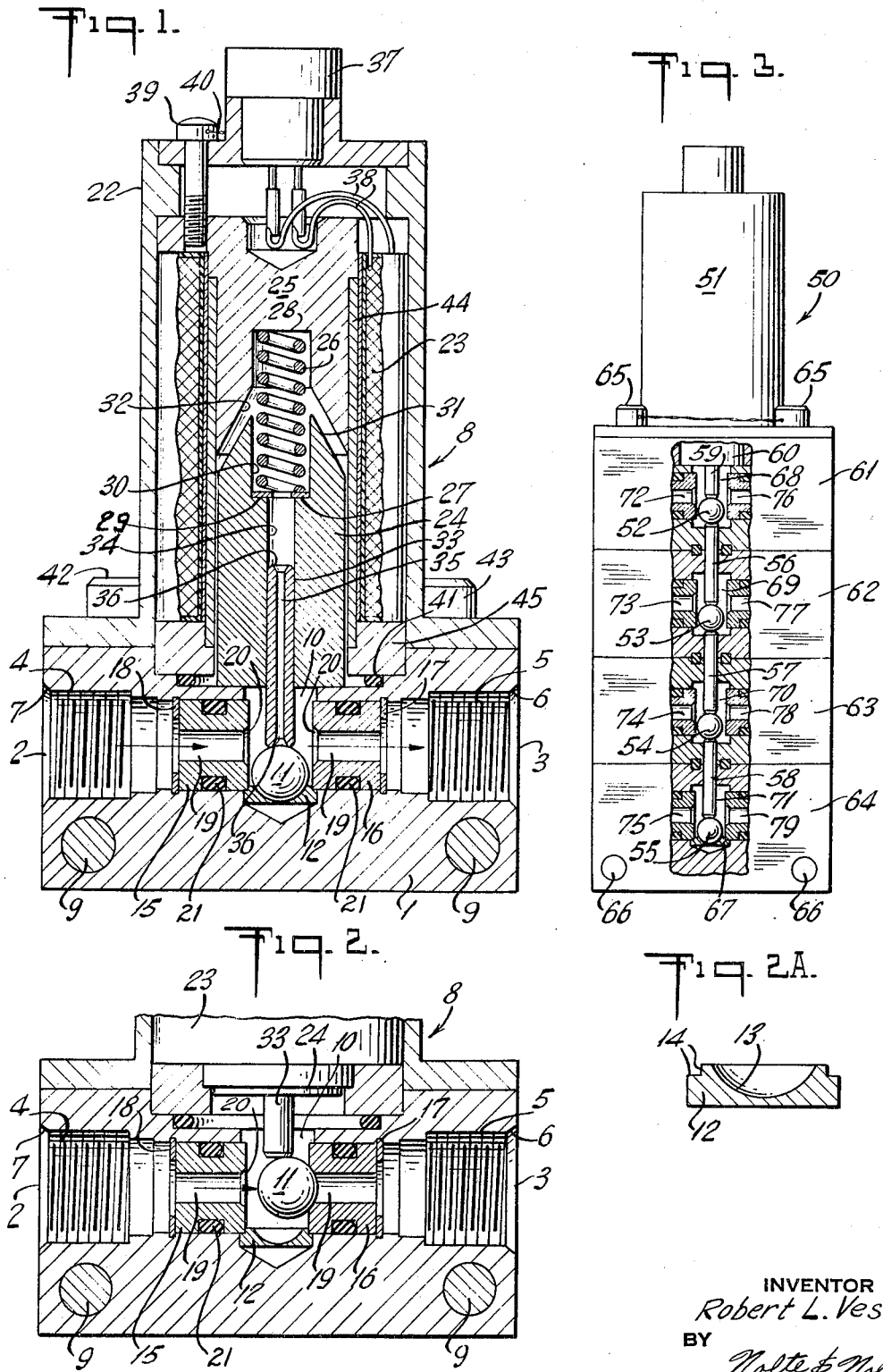
INVENTOR
Robert L. Vesco
BY
Nolte & Nolte
ATTORNEYS

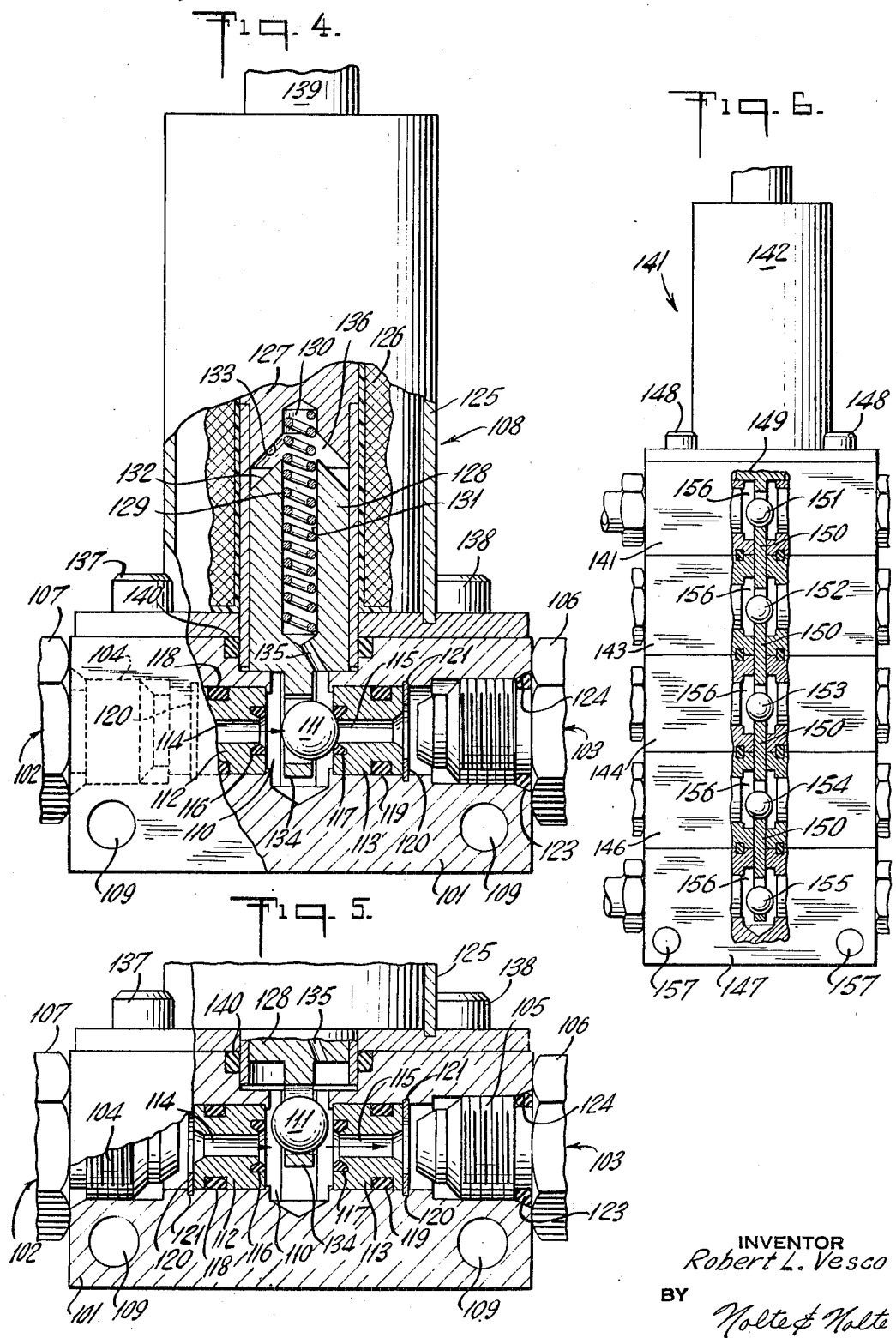

United States Patent Office 3,506,030
Patented Apr. 14, 1970

3,506,030
SOLENOID OPERATED BALL VALVE
Robert L. Vesco, Denville, N.J., assignor, by mesne assignments, to International Controls Corp., Fairfield, N.J., a corporation of Florida
Filed Oct. 27, 1966, Ser. No. 590,023
Int. Cl. F16k 31/06, 1/14
U.S. Cl. 137—595
4 Claims

ABSTRACT OF THE DISCLOSURE

Solenoid operated ball valves in which the ball is rolled or permitted to roll onto an annular inclined seating surface and is rolled off the surface by the armature and the coil is protected by a fluid tight sealing sleeve.

---

This invention relates to valves and more particularly to a solenoid operated ball valve.

An object of the present invention is to provide a valve which can be operated or activated from a remote location.

Another object of the present invention is to provide a valve which can simultaneously control the flow of fluid through a plurality of passages or conduits.

A further object of the present invention is to provide a valve in which the valve head comprises a spherical member of predetermined diameter, the seating force of said member being a function of its diameter.

A still further object of the present invention is to provide a solenoid operated ball valve in which an armature of a solenoid influences the location of the ball head.

Another object of the present invention is to provide a solenoid operated ball valve of a construction in which the ball head may either be pushed or pulled into or out of a sealing position.

A still further object of the present invention is to provide a solenoid operated ball valve in which the armature of a solenoid is spring biased to influence and retain a ball head out of a sealing position when in an unoperated position.

A still further object of the present invention is to provide a solenoid operated ball valve having passageways capable of being interchangeably inlet and outlet passages.

A further object of the present invention is to provide a solenoid operated ball valve which is adapted to receive standard pipe fitting conections. Further objects of the present invention will become obvious to those skilled in the art.

According to one aspect of the present invention, a valve body having a plurality of passages therethrough is formed with an internal chamber which communicates with said passages. A ball valve head is confined within said chamber. A solenoid is disposed substantially perpendicularly to said passages and has an armature which is spring biased toward said chamber. A rod is connected to said armature, which rod extends into said chamber and retains the ball head out of contact with the openings or ports of said passages communicating with the chamber when in an unactivated or deenergized condition. In this way fluid is permitted to pass from at least one passage into the chamber and out of at least one of the other passages. When a circuit which is electrically connected to the solenoid is closed, the electromagnetic field of the coil of the solenoid retracts the armature toward the coil, thereby compressing the spring and further permitting the fluid forces of the fluid flowing within said passages to influence the ball head against a predetermined port and seat, thereby sealing off the passage connected to said port and preventing fluid from entering. The upstream pressure of the fluid entering the chamber will retain the ball head against the seat until the solenoid is deactivated or deenergized and the compression biased spring shifts the armature and rod toward the chamber, thereby pushing the ball head from the port which it was sealing causing the ball to roll out of sealing position and permitting the flow of fluid through the previously sealed passage.

In other embodiments of the present invention, the ball head is forced against the seat port means when the solenoid is in an deactivated condition, and upon activation of the solenoid, a ring surrounding a portion of the spherical head pulls the ball head from the sealing condition to a flow condition in which fluid is permitted to freely flow through the passages. It is also contemplated by further embodiments of the present invention to provide a plurality of ball valves operated by a single solenoid in which connecting members simultaneously influence a member of ball heads such that similar flow characteristics can be accomplished in more than one set of passages. Advantages of the last described embodiments become obvious when one considers that successive valve means can be "stacked" such that one set of controls and one solenoid may influence a great many valves.

The invention will become more clearly understood from the following description of specific embodiments of the invention together with the accompanying drawings in which:

FIG. 1 is a partial sectional elevation of an embodiment of the present invention utilizing a push rod, and showing the valve in a flow condition;

FIG. 2 is a partial sectional elevation of a portion of the embodiment shown in FIG. 1 in which the valve is in a sealing condition;

FIG. 2A is an enlarged sectional elevation of a retaining member;

FIG. 3 is a partial sectional elevation of an embodiment of the present invention utilizing a plurality of valves and push rods;

FIG. 4 is a partial sectional elevation of another embodiment of the present invention;

FIG. 5 is a partial sectional elevation of a portion of the embodiment of the invention shown in FIG. 4 in which the valve is in a flow permitting condition; and FIG. 6 is a partial sectional elevation of the present invention illustrating a plurality of "stacked" valves.

Referring now to the figures, FIG. 1 is a partial sectional elevation of an embodiment of the present invention, in which a body or housing 1 of a valve 8 is shown to have an inlet passage 2 and an outlet passage 3. Threads 4 and 5 are formed at the entrance of said passages 2 and 3 such that predetermined and selected pipe fittings or other types of conventional joints may be accommodated. Entrance chambers 6 and 7 enable housing 1 to be easily and rapidly fitted-up with conduits which carry fluid that is to be controlled by the present valve.

FIG. 1 contains arrows which represent flow from passage 2, through the valve, and then out passage 3. With this flow pattern, passage 2 would comprise an inlet passage and passage 3 would comprise an outlet passage, however, it is intended and is within the scope of this invention to provide a valve which may accommodate reversible flow characteristics such that upon reversal of the flow of the fluid through valve 8, shown in FIG. 1, passage 3 would comprise the inlet passage and passage 2 would comprise the outlet passage. It is intended that the operation of valve 8 will function equally well in either flow case.

Mounting means 9 are provided, such as mounting holes, to enable valve 8 to be secured, positioned or located in a desired manner.

A chamber 10 is disposed within body 1 and is formed to confine a spherical member such as ball 11. Retaining member 12, shown in more detail in FIG. 2A, is disposed at the bottom of chamber 10. A concave portion 13 of retaining member 12 is formed therein such that ball 11 may seat itself in concave portion 13 when in the flow position shown in FIG. 1. Shoulder portions 14 provide bearing surfaces for seat members 15 and 16 which are located between passages 2 and 3 leading to and communicating with chamber 10. Snap-type retaining rings 17 and 18 are received in grooves formed in passages 2 and 3 such that when inserted, seat members 15 and 16 are locked in place.

Seat members 15 and 16 may be constructed such that they are identical in shape and material. This will enable interchangeability of parts and reduces tooling costs and requirements. A duct 19 is formed in seat members 15 and 16, said ducts providing a path for fluid to flow therethrough during the operation of valve 8. Duct 19 in each seat member terminates in the portion of seat members 15 and 16 adjacent chamber 10 in a tapered valve seat 20 formed in each seat member 15 and 16 and adapted to receive a portion of ball 11. FIG. 2 illustrates ball 11 seated in valve seat 20 formed in seat member 16, thereby sealing off duct 19 in seat member 16 and preventing fluid from flowing therethrough.

Sealing means such as O-rings 21, which are retained in grooves in seat members 15 and 16 respectively, provide a seal such that fluid is unable to bypass either of seat members 15 and 16 in any manner other than through ducts 19 therethrough. In this way, control is had over the behavior of the fluid being conducted through the valve.

Referring again to FIG. 1, a coil shell 22, secured to body 1 by screws 42 and 43, is shown to extend substantially perpendicularly from passages 2 and 3 which communicate with chamber 10, said coil shell enveloping a solenoid coil assembly 23 comprising a plurality of windings. An armature 24 forms part of a core within coil assembly 23 and is coaxially disposed in alignment with stationary core member 25. Armature 24 and stationary core member 25 are longitudinally spaced from each other and are maintained in a varying spaced relationship by means of spring means such as helical spring 26 which is maintained in compression. The end portions of spring 26 bear against washer 27 at the armature end and bearing surface 28 of stationary core member 25. Washer 27 is located against bearing surface 28 within cavity 30 formed in the upper end of armature 24. The external portion of the upper end of armature 24 is formed with a truncated cone 31 which may be matingly received by hollow 32 formed in stationary core member 25. FIG. 1 illustrates the valve assembly when the solenoid coil assembly is deenergized, however upon energizing the solenoid coil assembly 23, armature 24 is electromechanically retracted within coil assembly 23 such that helical spring 26 is compressed and truncated cone portion 31 substantially mates with hollow 32. Upon deenergizing coil assembly 23, helical spring 26 biases armature 24 downward and out of said mated relationship.

A pin 33 is disposed within groove 34 formed in armature 24. Pin 33 is formed with a longitudinal bore 35 therethrough, said bore ending in a chamfer 36 at either end of pin 33.

Thus it is seen the fluid is able to enter the area between the stationary core member 25 and armature 24 by entering inlet passage 2, being conducted through duct 19 in seat member 15, entering chamber 10, being conducted through bore 35 in pin 33, traveling upward through groove 34 in armature 24 and finally entering cavity 30 in armature 24. The presence of fluid within these areas is desirable in accomplishing specific design requirements and satisfactorily influences working characteristics.

A connector 37 is provided at the top of the housing above coil shell 22 and is electrically connected to solenoid coil assembly 23 by means of connectors such as wires 38. The connector assembly 37 is fastened to coil shell 22 by means of screws 39 or other suitable fastening means. In the case of the use of screws to fasten the connector assembly 37 to coil assembly 22, a wirelock 40 may be used to insure that screws 39 cannot turn and thereby be loosened. Connector 37 is constructed so as to mate with another connector.

To insure that the coil assembly does not come in contact with fluid, an O-ring 41 and, moreover, a sealing sleeve 80 preferably of a synthetic resin or plastic, axially coextensive with the coil are provided as shown in FIG. 1 and the remaining mating surfaces such as between sleeve 44 and stationary core member 25, and between member 45 and sleeve 44 are permanently sealed by conventional methods such as soldering, brazing, welding or by using epoxy adhesive.

It is to be emphasized that the present invention, in its use of a ball against a valve seat of predetermined smaller diameter, takes advantage of fluid line pressure in sealing and uncovering the fluid conducting passages within the valve housing. Due to the fact that there is equal pressure at every point in the void formed by chamber 10 and chamber 110 in the steady state sealing condition when ball 11 (FIG. 1) or ball 111 (FIG. 4) is sealing off passages 19 and 115 respectively, the line pressure will be acting upon the surfaces of the balls 11 and 11 which are exposed to the chamber line pressure and on the downstream side of the balls. The result is a cancelling of pressure forces on the portions of the ball outside the projected area of the sealed passage opening. Thus the sealing force will approximate, but not be limited to the fluid line pressure times the projected passage cross-sectional area. Thus the dislodging force necessary to open the valve to a flow condition is far less than that of conventional valves and the design parameters of passage diameter, seat angle, ball diameter and line pressure may be predetermined and varied.

In operation, FIG. 1 shows armature 24 and pin 33 biased downward by spring 26 such that ball 11 is caused to bear against concave portion 13 of retaining member 12, thereby permitting the flow of fluid from inlet passage 2 through duct 19 of seat member 15, thereafter into chamber 10, then through duct 19 of seat member 16 and finally being discharged through outlet passage 3. Of course, it is contemplated by the present invention, as previously stated, that passage 3 may become an inlet passage and passage 2 an outlet passage such that the present invention as herein described contemplates the reversal and interchange-ability of said passages. Thus, FIG. 1 illustrates a flow condition wherein coil assembly 23 is deenergized.

Upon energizing coil assembly 23 by remote means (not shown), armature 24 and pin 33 are retracted upward, compressing spring 26 and relieving pressure formerly applied upon ball 11. The result is a shifting of ball 11 into the position shown in FIG. 2 wherein the fluid forces of the fluid entering chamber 10 from duct 19 in member 15 will force ball 11 against valve seat 20 in member 16. In the no-flow condition shown in FIG. 2, duct 19 in seat member 16 is sealed off by means of ball 11 being forced against seat 20 and the result is a stoppage of the flow of fluid through valve 8. It is contemplated by the present invention that by varying the diameter of ball 11 and the angle which seat 20 makes with seat member 16 of the valve seating force may be predetermined, selected, and controlled, thereby enabling the same type of valve to be used in systems which may vary in pressure. It is contemplated that the present invention will minimize the wear of the valve seat, such as seat 20, by the ability to control seating pressure, diameter of ball 11, the angle which seat 20 makes with seat number 16 and the diameter of duct 19. The foregoing variables are not intended to be limited so as not to include further independent and dependent design variables to be used in determining respective valve characteristics.

FIG. 3 illustrates an embodiment of the present invention wherein a valve 15 comprises multiple ports such that the activation of a solenoid, in the manner described for the embodiment shown in FIGS. 1 and 2, will influence the movement of balls 52, 53, 54, and 55. Pins 56, 57, and 58 extend between balls 52 and 53, 53 and 54, and 54 and 55 respectively in floating relationships. Pin 59, which is connected to armature 60 in FIG. 3, is biased downward against ball 52 when solenoid 51 is deenergized. Thus, valve 50 is shown in FIG. 3 to be in a flow-condition in which fluid is permitted to flow through bodies 61, 62, 63 and 64. Said bodies 61, 62, 63 and 64 are "stacked" together and secured by means of screws 65. Mounting means 66 are provided in any number of said bodies such as shown in body 64.

Upon the biasing of armature 60 and pin 59 downward, the downward force is transmitted from pin 59 to ball 52, ball 52 to pin 56, pin 56 to ball 53, ball 53 to pin 57, pin 57 to ball 54, ball 54 to pin 58, pin 58 to ball 55 and finally ball 55 is forced against retaining member 67. Upon energizing solenoid 51, armature 60 and pin 59 are retracted upward, thereby enabling the fluid forces of the fluid entering the respective bodies to urge the respective balls within said bodies upward and against the respective seats. More specifically, fluid entering chambers 68, 69, 70 and 71 through ducts 72, 73, 74 and 75 will exert a differential pressure on the projected cross-sectional area of balls 52, 53, 54 and 55 respectively, whereupon pins 56, 57 and 58 will be forced upward and ducts 76, 77, 78, and 79 will be sealed off.

It should be obvious to one skilled in the art that the embodiment shown in FIG. 3 is in no way limited to four bodies as shown in which ports are formed, and the invention contemplates the use of single activating means, such as solenoid 51 in the case shown in FIG. 3, for activating a predetermined and selected number of multiple port body combinations. It is to be further recognized that the feature of reversibility of inlet and outlet ports and passages may be accomplished in the embodiment shown in FIG. 3 as well as that shown in FIGS. 1 and 2.

FIGS. 1–3 contemplate examples of the use of activating means such as a solenoid for pushing a ball out of the path of the flow of fluid through a valve. FIGS. 4–6, to be described below, illustrate embodiments in which it is contemplated to pull a ball into a sealing position, as opposed to pushing the ball and thereby positively influencing the sealing operation.

Referring now to FIG. 4, a body 101 is shown to have an inlet passage 102 and an outlet passage 103 through said body 101. Threads 104 and 105 are formed in passages 102 and 103 adjacent the external portions of said passages. Fittings 106 and 107 are shown in place as representing a conduit being connected to each of said passages. The valve shown in FIG. 4, generally designated as 108, is provided with mounting means 109 for positioning valve 108 in a desired manner. An internal chamber 110 is formed within body 101 and provides an enclosure for ball 111 floatably disposed therein.

Seat members 112 and 113 are located within passages 102 and 103 such that they are adjacent chamber 110. Ducts 114 and 115 are formed within seat members 112 and 113 respectively. Seat rings 116 and 117 are disposed in suitable grooves within seat members 112 and 113, and situated so as to surround the openings of ducts 114 and 115 into chamber 110. Sealing means such as O-rings 118 and 119 are located in suitable grooves in seat members 112 and 113 respectively and are compressed against the inside diameter of passages 102 and 103 when assembled as shown in FIG. 4. O-rings 118 and 119 insure that fluid being conducted between chamber 110 and passages 102 and 103 will not bypass seat members 112 and 113 except through ducts 114 and 115. Seat members 112 and 113 are retained in passages 102 and 103 respectively by retaining means such as retaining rings 120 confined within grooves 122 formed in body 101 immediately adjacent the seat numbers. Thus, movement of seat members 112 and 113 along the longitudinal axis of passages 102 and 103 is prevented. An O-ring 123 is shown between fitting 106 and chamfer 124 in body 101 so as to maintain a predetermined and selected working pressure of the fluid being conducted through valve 108.

A coil shell 125 encloses a solenoid coil assembly 126. Disposed within solenoid coil assembly 126 is a stationary core member 127, and an armature 128 which is free to move along the longitudinal axis of coil shell 125 as shown in FIG. 4. Spring means such as a helical spring 129 is compression biased between stationary core member 127 and moveable armature 128 such that the upper end of helical spring 129 is received by a cavity 130 formed in stationary code member 127, and the lower end of helical spring 129 is retained in a cavity 131 formed in armature 128. The upper external portion of armature 128 is formed with a shape of a truncated cone 132 which may be matingly received by hollow 133 formed in stationary core member 127.

The lower portion of armature 128 takes the form of a cylindrical ring 134 which surrounds a portion of ball 111 and which is capable of vertically displacing ball 111 by vertical movement of armature 128. In the position shown in FIG. 4, ball 111 is in a non-flow or sealing position wherein a portion of ball 111 is forced against seat ring 117 by the force of fluid entering chamber 110 from duct 114. The back pressure of said fluid will maintain ball 111 against seat ring 117 while ring 134 is in the position shown in FIG. 4. FIG. 4 illustrates valve 108 and its components when solenoid coil assembly 126 is deenergized and helical spring 129 is biasing armature 128 downward. Upon energizing solenoid coil assembly 126, armature 128 and ring 134 are retracted along the longitudinal axis of coil shell 125 such that ball 111 is pulled upward and away from seat ring 117 into the position shown in FIG. 5 wherein fluid is free to flow from inlet passage 102 through chamber 110 and out of passage 103. It is to be noted that it is contemplated by the present invention and within the scope thereof to provide reversibility of flow such that either of passages 102 and 103 may function as either an inlet passage or an outlet passage without disturbing the flow characteristics of the valve. It is to be further noted that seat members 112 and 113 may be constructed such that they are identical in shape and material.

A duct 135 communicates with cavity 131 and with chamber 110, facilitating the flow of fluid from chamber 110 through duct 135, through cavity 131 and into a void 136 between stationary core member 127 and armature 128. Screws 137 and 138 secure coil shell 125 to body 101. Electrical connector 139 is disposed above coil shell 125 and is electricaly connected to solenoid coil assembly 126. Electrical connector 139 facilitates the mating engagement of a mating electrical connector (not shown) therewith for easy installation. O-ring 140 is disposed within a groove in body 101 (FIG. 4) and seals off the working fluid from the solenoid coil assembly to seal the coil from the fluid there is provided a sealing sleeve essentially axially coextensive with the coil (FIG. 4).

Refering now to FIG. 6, valve 141 is shown to comprise a plurality of bodies, in this case five, which are responsive to activation by a solenoid 142. Bodies 143, 144, 145, 146, and 147 are shown in FIG. 6 to be aligned and secured together by means of screws 148. Armature 149 of solenoid 142 has as an integral part of its lower end a plurality of rings 150, which surround portions of balls 151, 152, 153, 154 and 155, disposed in chambers 156 of the respective bodies. Solenoid 142 may be constructed in much the same manner as the embodiment shown in FIG. 4, and thus upon the solenoid coil being deenergized, spring means (not shown) within solenoid 142 will bias armature 149 and rings 150 downward, thereby locating balls 151, 152, 153, 154 and 155 in a predetermined position. Upon energizing the coil of solenoid 142, all of the balls within chambers 156 will be urged upward, thereby either permitting the flow of fluid through the valve (FIG. 6) or creating a sealed condition, depending upon the predetermined application of the said valve. Mounting means 157 are provided in body 147 for locating valve 141.

It is within the scope of the present invention to utilize either a "push" or "pull" action in any of the embodiments thereof. It should also be understood when referring to FIGS. 4 and 6 that when combining a plurality of bodies to form an overall valve which can be actuated by either a push or pull type solenoid, it is contemplated to utilize interchangeability of parts. This can be readily seen when considering the use of body 101 shown in FIG. 4 in place of body 147 shown in FIG. 6, for example.

What is claimed is:

1. A solenoid operated ball valve, comprising a body having at least one valve chamber and inlet and outlet openings communicating therewith in mutual alignment, said chamber having at least one wall portion in which said outlet opening is disposed, said openings communicating with fluid conducting passages within said body, a ball disposed within said valve chamber, spaced seat means for said ball for sealing off at least one of said passages, each of said seat means communicating between one of said openings and said chamber and defining a fluid conduit which initially tapers in the direction away from the chamber to define an inclined annular surface, the angle of said taper and the diameters of the tapered portion of the conduit being so selected that a portion of said ball may enter said tapered portion of the conduit and bear against said annular surface to seal off and prevent fluid flow through said conduit, a solenoid operatively connected to an elongated member having a free end extending into the chamber and said solenoid being arranged to move said elongated member along a line essentially perpendicular to the line between the points of communication of said inlet and outlet openings with the chamber, said chamber being so dimensioned along the line of movement of said member as to permit accommodation of said ball with the center of the ball below the line of communication of the inlet and outlet openings within the chamber, said member being movable by the solenoid to an extended position in which the free end of the member bears against the surface of the ball and thereby retains the ball in a non-sealing position with the center of the ball below said line of communication and to a retracted position and during which retraction the ball is permitted to float to said line of communication solely under the influence of the pressure differential created in said chamber by the flow of fluid therethrough until the center of the ball is lying upon said line of communication whereby the pressure of the fluid flowing through the chamber urges a portion of the ball into said tapered portion of the conduit and bearing against said inclined surface to seal off and prevent fluid flow through said conduit, and for opening of the valve said member being movable back to its extended position whereby the free end of the member pushes against the ball and causes the ball to roll off the inclined surface and then the member again retains the ball in the position with the center of the ball below the line of communication of the inlet and outlet openings.

2. A valve according to claim 1, in which said body comprises a predetermined number of stacked subassemblies each having ball means for sealing off predetermined passages therethrough.

3. A solenoid operated ball valve, comprising a body having at least one valve chamber and inlet and outlet openings communicating therewith in mutual alignment, said chamber having at least one wall portion in which said outlet opening is disposed, said openings communicating with fluid conducting passages within said body, a ball disposed within said valve chamber, spaced seat means for said ball for sealing off at least one of said passages, each of said seat means communicating between one of said openings and said chamber and defining a fluid conduit which initially tapers in the direction away from the chamber to define an inclined annular surface, the angle of said taper and the diameters of the tapered portion of the conduit being so selected that a portion of said ball may enter said tapered portion of the conduit and bear against said annular surface to seal off and prevent fluid flow through said conduit, a solenoid operatively connected to an elongated member extending into the chamber and said solenoid being arranged to move said elongated member along a line essentially perpendicular to the line between the points of communication of said inlet and outlet openings with the chamber, said member being movable by the solenoid to a first position in which the member retains the ball in a position in the chamber with the center of the ball out of the line of communication of the inlet and outlet openings and to a second position in which the ball is guided by the member to a position in the chamber in which the center of the ball meets said line of communication and thereupon the ball is moved by the pressure of the fluid flowing through the chamber so that a portion of the ball extends into said tapered portion of the conduit and bears against said inclined surface to seal off and prevent fluid flow through said conduit, and for opening of the valve said member being movable back to its first position whereby the member pushes against the ball and causes the ball to roll off the inclined surface and the member again retains the ball in the position with the center of the ball out of said line of communication, said solenoid comprising a sleeve, a core fixedly mounted in one end of the sleeve, and an armature slidably positioned in the other end of the sleeve, an annular coil positioned around and concentric with said sleeve and an annular fluid tight seal positioned around and concentric with the sleeve and between the sleeve and the coil, said seal being axially coextensive with the coil.

4. A valve according to claim 3, in which said body comprises a predetermined number of stacked subassemblies each having ball means for sealing off predetermined passages therethrough.

References Cited

UNITED STATES PATENTS

| 3,324,889 | 6/1967 | Batts | 137—625.69 |
| 3,326,239 | 6/1967 | Saint-Joanis et al. | 137—625.66 |
| 1,334,870 | 3/1920 | Lowry | 251—211 |
| 2,263,470 | 11/1941 | Perkins et al. | 137—636 XR |
| 2,366,412 | 1/1945 | Lambert | 251—139 XR |
| 2,629,578 | 2/1953 | Paul | 137—519.5 XR |
| 2,750,962 | 6/1956 | Kreitchman et al. | 251—129 XR |
| 2,822,818 | 2/1958 | Breznick | 251—129 XR |
| 3,057,375 | 10/1962 | Etter | 137—609 XR |

FOREIGN PATENTS

| 613,841 | 1/1961 | Canada. |
| 663,367 | 12/1951 | Great Britain. |

HENRY T. KLINKSIEK, Primary Examiner

U.S. Cl. X.R.

251—129